United States Patent
Bayer et al.

(10) Patent No.: US 12,435,273 B2
(45) Date of Patent: Oct. 7, 2025

(54) METHOD FOR ETCHING AT LEAST ONE SURFACE OF A PLASTIC SUBSTRATE

(71) Applicant: Atotech Deutschland Gmbh & Co. KG, Berlin (DE)

(72) Inventors: Frank Bayer, Berlin (DE); Carl Christian Fels, Berlin (DE); Philip Hartmann, Berlin (DE); Torsten Voss, Berlin (DE)

(73) Assignee: Atotech Deutschland Gmbh & Co. KG, Berlin (DE)

( * ) Notice: Subject to any disclaimer, the term of this patent is extended or adjusted under 35 U.S.C. 154(b) by 242 days.

(21) Appl. No.: 18/547,343

(22) PCT Filed: Feb. 25, 2022

(86) PCT No.: PCT/EP2022/054752
§ 371 (c)(1),
(2) Date: Aug. 22, 2023

(87) PCT Pub. No.: WO2022/180197
PCT Pub. Date: Sep. 1, 2022

(65) Prior Publication Data
US 2024/0124777 A1 Apr. 18, 2024

(30) Foreign Application Priority Data
Feb. 26, 2021 (EP) .................... 21159719

(51) Int. Cl.
*C09K 13/12* (2006.01)
*C08J 7/14* (2006.01)
*C09K 13/04* (2006.01)
*C23C 18/24* (2006.01)
*C23C 18/16* (2006.01)
*C23C 18/20* (2006.01)
*C25D 5/14* (2006.01)
*C25D 5/56* (2006.01)

(52) U.S. Cl.
CPC .............. *C09K 13/12* (2013.01); *C08J 7/14* (2013.01); *C09K 13/04* (2013.01); *C23C 18/24* (2013.01); *C08J 2355/02* (2013.01); *C23C 18/1653* (2013.01); *C23C 18/2086* (2013.01); *C25D 5/14* (2013.01); *C25D 5/56* (2013.01)

(58) Field of Classification Search
None
See application file for complete search history.

(56) References Cited

U.S. PATENT DOCUMENTS

| | | | |
|---|---|---|---|
| 5,308,387 A * | 5/1994 | James | C23C 18/22 106/311 |
| 2011/0140035 A1 * | 6/2011 | Schildmann | C23C 18/24 252/79.2 |
| 2017/0156216 A9 | 6/2017 | Liu et al. | |
| 2021/0062356 A1 * | 3/2021 | Brouwer | C23C 22/73 |
| 2024/0003013 A1 * | 1/2024 | Bayer | C23C 18/2086 |
| 2024/0068105 A1 * | 2/2024 | Szamocki | C25B 1/21 |

FOREIGN PATENT DOCUMENTS

| | | | | |
|---|---|---|---|---|
| EP | 2465973 A2 | 6/2012 | | |
| EP | 2657367 A1 * | 10/2013 | ......... | C23C 18/2086 |
| EP | 3434806 A1 | 1/2019 | | |
| EP | 3660189 A1 | 6/2020 | | |

OTHER PUBLICATIONS

PCT/EP2022/054752; International Search Report and Written Opinion of the International Searching Authority dated Apr. 12, 2022.

* cited by examiner

Primary Examiner — Allan W. Olsen
(74) Attorney, Agent, or Firm — Renner, Otto, Boisselle & Sklar, LLP

(57) ABSTRACT

The present invention relates to a method for etching at least one surface of a plastic substrate, the method comprising steps (A) to (C), wherein step (B) comprises a contacting with a pre-treatment composition comprising one or more than one fluorine-free surface-active compound, and step (C) comprises a contacting with an etching composition comprising one or more than one manganese species, wherein after step (B) and prior to step (C) no rinsing is applied, and the etching composition is substantially free of, preferably does not comprise, fluorine-containing surface-active compounds.

15 Claims, No Drawings

METHOD FOR ETCHING AT LEAST ONE SURFACE OF A PLASTIC SUBSTRATE

This application is a national phase of International Application No. PCT/EP2022/054752, filed 25 Feb. 2022, which claims priority to European Patent Application No. 21159719.0, filed 26 Feb. 2021, each of which is hereby incorporated herein by reference in its entirety.

FIELD OF THE INVENTION

The present invention relates to a method for etching at least one surface of a plastic substrate, the method comprising steps (A) to (C), wherein step (B) comprises a contacting with a pre-treatment composition comprising one or more than one fluorine-free surface-active compound, and step (C) comprises a contacting with an etching composition comprising one or more than one manganese species, wherein after step (B) and prior to step (C) no rinsing is applied, and the etching composition is substantially free of, preferably does not comprise, fluorine-containing surface-active compounds.

BACKGROUND OF THE INVENTION

Metallizing non-metallic substrates such as plastic substrates has a long history in modern technology. Typical applications are found in automotive industry as well as for sanitary articles.

However, making a plastic substrate receptive for a metal layer is demanding. Typically, a respective method starts with a surface modification of the substrate's surface, typically known as etching. Usually, a sensitive balance is required in order to ensure a sufficient surface roughening on the one hand without causing too strong defects on the other hand.

A variety of methods and etching compositions are known, including compositions comprising chromic acid. Chromic acid is highly corrosive and a strong oxidant. It therefore very efficiently and strongly etches plastic substrates.

For example, EP 3 434 806 A1 refers to a chrome-free etch solution which is aqueous and alkaline. Further, the aqueous alkaline etch solution is a chrome-free etch solution, free of hazardous acids, such as sulfuric acid and nitric acid, and is also a permanganate-free etch.

EP 2 465 973 A2 refers to the field of catalysts useful in electroless metal plating of non-conductive substrates used in the manufacture of electronic devices.

However, an intense and strong etching is not the only requirement. In order to obtain an equally distributed etching pattern all over a substrate's surface, sufficient wettability is required, too. This becomes particularly critical if the substrate has a sophisticated surface geometry, for example including holes and/or bucklings (i.e. kinks) forming angles e.g. including 60° to 130°. A typical example are relief structures on the substrate's surface. Such substrates often show a diverse and irregular etching pattern, in particular in such critical areas. In many a sufficient etching is achieved by utilizing surface-active organic compounds in a respective etching composition.

As already mentioned, chromic acid is a strong oxidant, thereby subjecting organic compounds to strong decomposition. Although the chemical stability of surface-active compounds can be increased by (partly or fully) fluorination, waste-water treatment and environmental sustainability becomes an issue in return. Both is not desired.

Although a combination of chromic acid and fluorinated surfactants is very effective and well known, increasing sustainability demands alternative etching compositions, avoiding harmful chromic acid and (partly as well as fully) fluorinated surfactants.

A well-known alternative is an etching composition comprising one or more than one manganese species. However, also manganese species typically have a strong oxidation ability towards organic compounds. Furthermore, also wettability is of high concern; in particular if the substrate has a sophisticated geometry as already mentioned above. This is particularly the case if the manganese-based etching composition comprises a comparatively high concentration of acids and a comparatively low amount of water, which typically leads to high-density compositions.

For example, EP 3 660 189 A1 refers to a composition of an etching solution and a process for metallizing electrically non-conductive plastic surfaces of articles using the etching solution. The etching solution is based on a stabilized acidic permanganate solution.

As mentioned, also manganese-based etching compositions are in most cases chemically strong. However, due to increased environmental demands, fluorinated surfactants are not a sustainable option anymore.

Therefore, there is a still ongoing demand to further improve existing manganese-based etching processes to provide not only excellent etching results but also in a sustainable manner.

OBJECTIVE OF THE PRESENT INVENTION

It is therefore the objective of the present invention to provide an etching process that eliminates the use of environmentally questionable surface-active compounds (in particular partly as well as fully fluorinated surface-active compounds) in combination with manages-based etching compositions without compromising the etching quality.

It is furthermore an objective of the present invention to even improve the etching and process quality compared to commonly used manganese-based etching compositions.

SUMMARY OF THE INVENTION

Above mentioned objectives are solved by a method for etching at least one surface of a plastic substrate, the method comprising the steps
 (A) providing the substrate,
 (B) contacting the substrate with a pre-treatment composition such that a pre-treated substrate is obtained, the pre-treatment composition comprising
   (B-a) one or more than one fluorine-free surface-active compound, and
 (C) contacting the pre-treated substrate with an etching composition in an etching compartment such that an etched substrate is obtained, the etching composition comprising
   (C-a) one or more than one manganese species,
 characterized in that
   the pre-treated substrate is not rinsed after step (B) and prior to step (C), and
   the etching composition is substantially free of, preferably does not comprise, fluorine-containing surface-active compounds.

The present invention is primarily based on a specific combination of steps, namely consecutive steps (B) and (C) as defined above without a rinsing step between both steps (i.e. the pre-treated substrate is not rinsed after step (B) and prior to step (C)). Own experiments have shown that the surface of the plastic substrate remains sufficiently wetted with the one or more than one fluorine-free surface-active compound contained in the pre-treatment composition. Thus, preferred is a method of the present invention, wherein after step (B) at least a portion of (B-a) remains on the substrate while the substrate is transferred to step (C).

The fluorine-free surface-active compounds remaining on the substrate are present in a sufficient amount for the subsequent etching step (as defined throughout the present text) to excellently etch plastic substrates with even sophisticated geometries. It appears that it is of great benefit if the surface is already covered with a surface-active compound prior to contacting it with the etching composition for etching. It was in particular surprising that under such conditions no surface-active compounds are additionally needed in the etching composition at all.

This has a great benefit, in particular if the etching composition utilized in the method of the present invention comprises comparatively low amounts of said manganese species. Typically, many surface-active compounds react with manganese species and form on the one hand undesired breakdown product. On the other hand, these undesired side-reactions also significantly reduce the concentration of active manganese species needed for the etching itself. It is therefore very much desired to not have a constant concentration of surface-active compounds in the etching composition itself but rather to provide only the absolute necessary amount. This can be excellently achieved by the method of the present invention. The total concentration of surface-active compounds in the etching composition is kept to a minimum. But not only this, it is also kept to the optimal amount because the surface-active compounds are primarily present directly on the surface of the substrate because no rising is carried out prior to step (C). Furthermore, an undesired degradation of the manganese species is also kept to a minimum. This is in particular important if the etching composition utilized in the method of the present invention is acidic. In many cases, manganese species are quite unstable in an acidic environment such that an undesired and rapid decomposition occurs. It is therefore of great benefit not to further enhance the decomposition by undesired side-reactions with surface-active compounds. The method of the present invention typically accomplishes all these benefits.

As a further result, often utilized fluorine-containing surface-active compounds are not needed at all in the method of the present invention in order to achieve an excellent surface wetting and thus, excellent etching result. Own experiments particularly show that (i) not only environmentally questionable surface-active compounds can be avoided (such as fully and partly fluorinated surface-active compounds) but (ii) even an improved wettability and therefore etching quality is achieved if the method of the present invention is carried out compared to commonly utilized manganese-based etching compositions either using no surface-active compounds at all or using surface-active compounds in the etching composition directly without utilizing a respective pre-treatment composition. As a result, the number of defective goods can be even further reduced and the amount of surface-active compounds is better controlled. Further details are given in the Examples below in the text, wherein details given therein most preferably also apply in general to the method of the present invention as defined throughout the present description.

The method of the present invention furthermore allows a higher measure of flexibility. In general, the etching composition utilized in the method of the present invention can be kept free of excessive amounts of surface-active compounds. This is of great advantage and typically prolongs the lifetime of such an etching composition, even if used in combination with a fluorine-free surface-active compound.

DETAILED DESCRIPTION OF THE INVENTION

In the context of the present invention the term "surface-active compound" is equal to (and therefore interchangeable with) "surfactants" and "wetting agent". For the purpose of this invention it is assumed that all these terms have a fully identical meaning.

Step (A):

In step (A) of the method of the present invention, the substrate is provided, which is a plastic substrate.

Preferred is a method of the present invention, wherein in step (A) the substrate comprises a thermoplastic substrate, preferably an amorphous thermoplastic substrate and/or a semi-crystalline thermoplastic substrate.

More preferred is a method of the present invention, wherein in step (A) the substrate comprises butadiene moieties, preferably polybutadiene.

Also preferred is a method of the present invention, wherein in step (A) the substrate comprises nitrile moieties.

Also preferred is a method of the present invention, wherein in step (A) the substrate comprises acryl moieties.

Very preferred is a method of the present invention, wherein in step (A) the substrate comprises polymerized styrene.

Most preferred is a method of the present invention, wherein in step (A) the substrate 2 comprises acrylonitrile butadiene styrene (ABS), acrylonitrile butadiene styrene-polycarbonate (ABS-PC), polypropylene (PP), polyamide (PA), polyetherimide (PEI), a polyetherketone (PEK), or mixtures thereof, preferably acrylonitrile butadiene styrene (ABS) and/or acrylonitrile butadiene styrene-polycarbonate (ABS-PC). Such plastic substrates are typically used in decorative applications such as automotive parts, in particular ABS and ABS-PC.

Preferred is a method of the present invention, wherein the polyetherketone (PEK) comprises polyaryletherketone (PAEK), poly ether ether ketone (PEEK), poly ether ether ether ketone (PEEEK), poly ether ether ketone ketone (PEEKK), poly ether ketone ether ketone ketone (PEKEKK), poly ether ketone ketone (PEKK), and/or mixtures thereof, preferably poly ether ether ketone (PEEK), polyaryletherketone (PAEK), and/or mixtures thereof.

As mentioned already above, particularly substrates with a sophisticated geometry are in particular challenging for metallization. In many technical applications substrates have an irregular surface including caverns, holes, reliefs, recesses, slits, kinks, etc., forming a number of difficult to access areas on the substrate especially for viscous and/or high density compositions such as etching compositions comprising high amounts of acid (typically having a density of >1 g/cm$^3$). The method of the present invention also addresses such "problematic" plastic substrates. Therefore, preferred is a method of the present invention, wherein in step (A) the substrate comprises at least one hole, cavern, recess, slit, and/or at least one buckling (in the sense of a kink), wherein at least one thereof constitutes at least two sub-areas relative to each other with an angle not being 180°, preferably having an angle ranging from 60° to 160°, more preferably from 65° to 140°, more preferably from 70° to 110°, most preferably from 80° to 100°. Although considered as problematic/sophisticated geometries, excellent results were obtained with the method of the present invention in particular for such substrates.

Furthermore, preferred is a method of the present invention, wherein the substrate provided in step (A) is not contacted prior to step (A) with any (preferably etching) composition comprising a chromium species.

Step (B):

In step (B) of the method of the present invention the substrate is contacted with the pre-treatment composition such that a pre-treated substrate is obtained. The pre-treatment 2 composition comprises (B-a) one or more than one fluorine-free surface-active compound.

Preferred is a method of the present invention, wherein the pre-treatment composition comprises water, preferably is an aqueous pre-treatment composition.

Preferred is a method of the present invention, wherein the pre-treatment composition comprises 50 wt.-% or more water, based on the total weight of the pre-treatment composition, preferably 60 wt.-% or more, more preferably 70 wt.-% or more, even more preferably 80 wt.-% or more, yet even more preferably 90 wt.-% or more, most preferably 95 wt.-% or more.

Preferred is a method of the present invention, wherein water is the only solvent in the pre-treatment composition.

However, in some other cases it is preferred that the pre-treatment composition comprises less than 50 wt.-% water, based on the total weight of the pre-treatment composition. Preferably, it depends on the total weight of acids in the etching composition whether the pre-treatment composition comprises the amounts of water as specified before. In some cases it is preferred that the amount of water in the pre-treatment composition is roughly identical to the amount of water in the etching composition. Thus, preferred is a method of the present invention, wherein the amount of water in the pre-treatment composition is within a range of ±20% of the amount of water in the etching composition, preferably ±10%, more preferably ±5%. However, this is not particularly limiting to the method of the present invention. In other cases it is preferred that the pre-treatment composition comprises water in a much higher amount than the etching composition.

In some cases, a method of the present invention is preferred, wherein the pre-treatment composition and the etching composition comprise identical acids, preferably identical inorganic acids (regarding acids in the etching composition, see text below).

The pre-treatment composition comprises (B-a), i.e. one or more than one fluorine-free surface-active compound. Thus, these compounds are neither fully nor partly fluorinated.

Preferred is a method of the present invention, wherein said one or more than one fluorine-free surface-active compound is saturated. More preferred, the one or more than one fluorine-free surface-active compound consists of carbon atoms, hydrogen atoms, and oxygen atoms.

Preferred is a method of the present invention, wherein said one or more than one fluorine-free surface-active compound is linear. Thus, they are preferably not branched compounds, and most preferably the pre-treatment composition is substantially free of, preferably does not comprise, branched surface-active compounds.

Preferred is a method of the present invention, wherein in (B-a) the one or more than one fluorine-free surface-active compound comprises a non-ionic surfactant, preferably a non-ionic alkyl polyethylene glycol ether, more preferably a non-ionic alcohol alkoxylate, most preferably a non-ionic fatty alcohol ethoxylate. Such surface-active compounds show excellent results in manganese-based etching compositions in combination with a pre-treatment composition as defined for the method of the present invention.

More preferred is a method of the present invention, wherein in the non-ionic alcohol alkoxylate the alcohol comprises 6 to 20 carbon atoms, preferably 7 to 18, more preferably 8 to 16, even more preferably 9 to 14, most preferably 10 to 12. This preferably applies likewise to the very preferred non-ionic fatty alcohol ethoxylate.

Preferred is a method of the present invention, wherein in the non-ionic alcohol alkoxylate the alkoxylate comprises 10 to 30 carbon atoms, preferably 12 to 28, more preferably 14 to 26, even more preferably 16 to 24, most preferably 18 to 22. This preferably applies likewise to the very preferred non-ionic fatty alcohol ethoxylate.

Preferred is a method of the present invention, wherein the non-ionic alcohol alkoxylate comprises a total of 20 to 40 carbon atoms, preferably 22 to 38, more preferably 24 to 36, even more preferably 26 to 34, most preferably 28 to 32. This preferably applies likewise to the very preferred non-ionic fatty alcohol ethoxylate.

Very preferred is a method of the present invention, wherein the non-ionic alcohol alkoxylate comprises a total of 28 to 34 carbon atoms, wherein thereof the alcohol comprises 10 to 12 carbon atoms and the alkoxylate 18 to 22 carbon atoms. This preferably applies likewise to the very preferred non-ionic fatty alcohol ethoxylate.

Most preferred is a method of the present invention, wherein said one or more than one fluorine-free surface-active compound is the only surface-active compound utilized throughout step (B), preferably throughout steps (B) and (C).

Preferred is a method of the present invention, wherein in the pre-treatment composition (B-a) has a total concentration ranging from 0.01 wt.-% to 40 wt.-%, based on the total weight of the pre-treatment composition, preferably from 0.1 wt.-% to 30 wt.-%, even more preferably from 0.2 wt.-% to 20 wt.-%, yet even more preferably from 0.3 wt.-% to 10 wt.-%, most preferably from 0.4 wt.-% to 5 wt.-%. Most preferably these total concentrations apply with the proviso that (B-a) comprise said preferred fluorine-free surface-active compounds as defined above.

As mentioned above, the pre-treatment composition preferably comprises water. In many cases, preferred is a method of the present invention, wherein in the pre-treatment composition water and (B-a) together form 98 wt.-% or more of the total weight of the pre-treatment composition, preferably 98.5 wt.-% or more, more preferably 99 wt.-% or more, even more preferably 99.5 wt.-% or more, yet even more preferably 99.9 wt.-% or more, most preferably 99.99 wt.-% or more.

In some cases, a method of the present invention is preferred, wherein the pre-treatment composition (essentially) consists of water and (B-a).

Preferred is a method of the present invention, wherein in step (B) the pre-treatment composition has a pH ranging from 1 to 9, preferably from 1.5 to 7.5 more preferably from 2 to 6.5, even more preferably from 2.5 to 5.5, most preferably from 3 to 5. It is generally preferred that the pH is acidic.

In some cases a method of the present invention is preferred, wherein in step (B) the pre-treatment composition has a pH within a range being ±3 of the pH of the etching composition, preferably ±2, more preferably ±1.5, even more preferably ±1, most preferably ±0.5.

Most preferred is a method of the present invention, wherein the pH of the pre-treatment composition and the etching composition is acidic, preferably is acidic and substantially identical.

Preferred is a method of the present invention, wherein in step (B) the contacting is carried out for a time ranging from 20 seconds to 15 minutes, preferably from 1 minute to 10 minutes, most preferably from 2 minutes to 6 minutes.

Preferred is a method of the present invention, wherein in step (B) the contacting is carried out at a temperature ranging from 20° C. to 70° C., preferably from 22° C. to 60° C., more preferably from 25° C. to 50° C., most preferably from 30° C. to 40° C.

Step (C):

In step (C) of the method of the present invention the pre-treated substrate obtained after step (B) is contacted with an etching composition in an etching compartment such that an etched substrate is obtained. The etching composition comprises (C-a), i.e. one or more than one manganese species.

Preferred is a method of the present invention, wherein the etching composition in step (C) is not a chromic acid/sulfuric acid etching composition. Furthermore, preferred is a method of the present invention, wherein the etching composition in step (C) is substantially free of, preferably does not comprise, chromic acid and chromium trioxide, respectively.

Preferred is a method of the present invention, wherein the etching composition in step (C) is substantially free of, preferably does not comprise, trivalent chromium ions.

Thus, preferred is a method of the present invention, wherein the etching composition is substantially free of, preferably does not comprise, trivalent chromium ions and hexavalent chromium compounds, preferably is substantially free of, preferably does not comprise, any ions and compounds comprising chromium.

In the context of the present invention, the one or more than one manganese species present in the etching composition include the active manganese species such that the pre-treated substrate is etched in step (C). In other words, these manganese species are interacting with the substrate in such a way that the pre-treated substrate is etched in step (C).

In the context of the present invention, steps (B) and (C) are distinct, i.e. different, steps. This includes, that the pre-treatment composition utilized in step (B) is distinct, i.e. different, from the etching composition utilized in step (C).

Active manganese species (preferably along with an acid; for acids see text below) typically oxidize and thereby etch the plastic substrate while they are itself reduced to (inactive or less active) manganese species typically having a lower oxidation number than before the etching. During this process an etching pattern is formed on the pre-treated substrate. In some cases, preferred is a method of the present invention, wherein in step (C) the one or more than one manganese species in the etching composition are at least partially formed by means of an electrical current. This most preferably applies if the electrical current is used to form active manganese species from inactive species (recycling).

Preferred is a method of the present invention, wherein the etching composition is acidic, preferably has a pH of 6.5 or below, more preferably of 5 or below, even more preferably of 3.5 or below, yet even more preferably of 2.5 or below, most preferably of 1.5 or below, even most preferably of 0.5 or below.

Preferred is a method of the present invention, wherein the etching composition has a pH of −1 or more, preferably of 0 or more, more preferably of 0.5 or more, most preferably of 1 or more; preferably the etching composition is acidic and has a pH of −1 or more, preferably of 0 or more, more preferably of 0.5 or more, most preferably of 1 or more.

Preferred is a method of the present invention, wherein the etching composition has a pH ranging from −1 to 6.5, preferably from 0 to 6, more preferably from 0.5 to 5.

Own experiments have shown that acidic etching compositions show better results as alkaline etching compositions. This most preferably applies to etching compositions utilized in the present invention comprising permanganate ions. Although permanganate ions are significantly less stable in an acidic environment, the etching result is in many cases better as well as the quality of subsequently deposited metal layers.

Preferred is a method of the present invention, wherein in the etching composition (C-a) has a total concentration ranging from 0.001 mol/L to 1.8 mol/L, based on the total volume of the etching composition and based on the element manganese, preferably ranging from 0.002 mol/L to 1.4 mol/L, more preferably ranging from 0.01 mol/L to 1.1 mol/L, most preferably ranging from 0.05 mol/L to 0.9 mol/L. In the context of the present invention, the total concentration (preferably also the preferred concentrations defined throughout the text) include the active and inactive manganese species, respectively. However, in industrial applications a steady flow of active manganese species is typically provided, preferably by a feed and bleed approach or by a recycling procedure, preferably a recycling procedure by means of applying an electrical current. This is also preferred in the context of the method of the present invention.

In some case, a method of the present invention is preferred, wherein in the etching composition (C-a) has a total concentration ranging from 0.0025 mol/L to 0.3 mol/L, based on the total volume of the etching composition and based on the element manganese, preferably ranging from 0.004 mol/L to 0.2 mol/L, more preferably ranging from 0.007 mol/L to 0.1 mol/L, most preferably ranging from 0.009 mol/L to 0.05 mol/L. This most preferably applies if the etching composition comprises permanganate ions and most preferably in addition phosphoric acid (for acids see text below).

In other cases, a method of the present invention is preferred, wherein in the etching composition (C-a) has a total concentration ranging from 0.1 mol/L to 1.8 mol/L, based on the total volume of the etching composition and based on the element manganese, preferably ranging from 0.2 mol/L to 1.6 mol/L, more preferably ranging from 0.3 mol/L to 1.4 mol/L, most preferably ranging from 0.4 mol/L to 1.2 mol/L. This most preferably applies if the etching composition comprises permanganate ions and additionally sulfuric acid, preferably permanganate ions and additionally 0.005 mol/L to 0.6 mol/L sulfuric acid.

Preferred is a method of the present invention, wherein in the etching composition the one or more than one manganese species comprises permanganate ions and/or manganese species comprising the element manganese in an oxidation number of +IV.

Preferably, the manganese species comprising the element manganese in an oxidation number of +IV are Mn(IV) ions.

Preferably, the manganese species comprising the element manganese in an oxidation number of +IV are colloidal. Preferably, the manganese species comprising the element manganese in an oxidation number of +IV comprises $MnO_2$, preferably colloidal $MnO_2$.

In many cases, preferred is a method of the present invention, wherein in the etching composition the one or more than one manganese species comprises permanganate ions.

In contrast, in some other cases, preferred is a method of the present invention, wherein the etching composition is substantially free of, preferably does not comprise, permanganate ions, preferably is substantially free of, preferably does not comprise, permanganate ions but instead comprises manganese species comprising the element manganese in an oxidation number of +IV (preferably as described above). More preferably, in such a case the etching composition comprises additionally manganese species comprising the element manganese in an oxidation number of +II and/or (preferably and) +III.

As already mentioned above, the etching composition can comprise one or more than one acid. Thus, preferred is a method of the present invention, wherein the etching composition further comprises
(C-b) one or more than one acid, preferably one or more than one inorganic acid, most preferably one or more than one inorganic acid selected from the group consisting of sulfuric acid, phosphoric acid, and nitric acid.

Regarding the presence and absence of acids as described hereinafter, reference is also made to the examples below, which preferably also apply to the method of the present invention in general.

In some cases, preferred is a method of the present invention, wherein the one or more than one inorganic acid comprises at least phosphoric acid.

In some other cases, preferred is a method of the present invention, wherein the one or more than one inorganic acid comprises at least sulfuric acid.

In some cases, very preferred is a method of the present invention, wherein the one or more than one inorganic acid is substantially free of, preferably does not comprise, sulfuric acid. Furthermore, preferred is a method of the present invention, wherein the one or more than one inorganic acid is substantially free of, preferably does not comprise, sulfuric acid but rather comprises phosphoric acid.

In some cases, preferred is a method of the present invention, wherein the one or more than one acid does not comprise organic acids.

Generally preferred is a method of the present invention, wherein the etching composition in step (C) has a density ranging from 0.9 g/cm$^3$ to 1.9 g/cm$^3$, preferably from 0.95 g/cm$^3$ to 1.7 g/cm$^3$.

In some cases, preferred is a method of the present invention, wherein the etching composition has a density in a range from 1.50 g/cm$^3$ to 1.90 g/cm$^3$, referenced to a temperature of 25° C., preferably from 1.55 g/cm$^3$ to 1.80 g/cm$^3$, more preferably from 1.60 g/cm$^3$ to 1.70 g/cm$^3$, most preferably from 1.61 g/cm$^3$ to 1.68 g/cm$^3$. This is most preferably the case if the etching composition comprises significant amounts of an acid, preferably of one or more than one inorganic acid, more preferably sulfuric acid and phosphoric acid, most preferably sulfuric acid and phosphoric acid, wherein the total molar amount of phosphoric acid is higher than the total molar amount of sulfuric acid.

In some other cases, preferred is a method of the present invention, wherein the etching composition has a density in a range from 1.15 g/cm$^3$ to 1.49 g/cm$^3$, referenced to a temperature of 25° C., preferably from 1.22 g/cm$^3$ to 1.41 g/cm$^3$, more preferably from 1.24 g/cm$^3$ to 1.39 g/cm$^3$, most preferably from 1.26 g/cm$^3$ to 1.38 g/cm$^3$. This is most preferably the case if the etching composition comprises significant amounts of phosphoric acid, most preferably in a total amount ranging from 7 mol/L to 12 mol/L, based on the total volume of the etching composition.

In yet some other cases, preferred is a method of the present invention, wherein the etching composition has a density in a range from 0.9 g/cm$^3$ to 1.3 g/cm$^3$, referenced to a temperature of 25° C., preferably from 0.93 g/cm$^3$ to 1.2 g/cm$^3$, more preferably from 0.95 g/cm$^3$ to 1.1 g/cm$^3$. This is most preferably the case if the etching composition comprises sulfuric acid, most preferably in a total amount ranging from 0.02 mol/L to 1 mol/L, based on the total volume of the etching composition, preferably from 0.04 mol/L to 0.7 mol/L, more preferably from 0.06 mol/L to 0.6 mol/L, even more preferably from 0.07 mol/L to 0.5 mol/L, most preferably from 0.08 mol/L to 0.4 mol/L.

Preferred is a method of the present invention, wherein the etching composition further comprises
(C-c) one or more than one species of transition metal ions different from manganese, preferably selected from the group consisting of titanium, zirconium, niobium, molybdenum, ruthenium, rhodium, nickel, copper, silver, palladium, zinc, and cadmium.

In the etching composition, (C-c) preferably stabilizes the etching composition and/or accelerates the etching in step (C). For example, palladium ions in the etching composition affect the etching quality insofar that in a subsequent palladium activation step a comparatively low concentration of palladium is required for efficient and sufficient activation, compared to an etching composition not comprising palladium ions. In addition, the etching quality itself directly after the etching is also improved if palladium ions are present.

Preferably, (C-c) is present in only small amounts.

Very preferred is a method of the present invention, wherein (C-c) is selected from the group consisting of nickel, copper, palladium, and silver, more preferably (C-c) comprises copper and/or silver ions, most preferably (C-c) comprises silver ions.

Preferred is a method of the present invention, wherein in the etching composition (C-c) (preferably the copper and the silver ions together, most preferably the silver ions) has a total concentration ranging from 0.1 mmol/L to 150 mmol/L, preferably from 0.3 mmol/L to 120 mmol/L, more preferably from 0.5 mmol/L to 100 mmol/L, even more preferably from 0.8 mmol/L to 80 mmol/L, yet even more preferably from 1 mmol/L to 60 mmol/L, most preferably from 1.5 mmol/L to 40 mmol/L.

Preferred is a method of the present invention, wherein the one or more than one fluorine-free surface-active compound in the pre-treatment composition is at least partly dragged out from the pre-treatment composition and dragged in into the etching composition. This is primarily possible because between step (B) and (C) no rinse is applied, i.e. the pre-treated substrate is preferably directly transferred from process step (B) to process step (C).

More preferred is a method of the present invention, wherein any total amount of fluorine-free surface-active compounds in the etching composition originates from the pre-treatment composition.

Preferred is a method of the present invention, wherein in step (C) in the etching composition fluorine-free surface-active compounds have an average total concentration ranging from 0.01 wt.-% to 1 wt.-%, based on the total weight of the etching composition, preferably from 0.02 wt.-% to 0.5 wt.-%, more preferably from 0.03 wt.-% to 0.2 wt.-%, most preferably from 0.04 wt.-% to 0.1 wt.-%. Average denotes during normal continuous operation such that continually surface-active compounds are dragged in into the etching composition and some are dragged out and/or decomposed.

Preferred is a method of the present invention, wherein in step (C) the etching composition has a surface tension of 69 mN/m or below, preferably of 68 mN/m or below, more preferably of 66 mN/m or below, even more preferably of 63 mN/m or below, yet even more preferably of 59 mN/m or below, almost most preferably of 55 mN/m or below, most preferably of 50 mN/m or below.

Preferred is a method of the present invention, wherein in step (C) no electrical current is applied to etch the substrate. This means that the process of etching itself is purely chemical based and no electrical current is involved. This does not exclude an electrical current utilized to re-oxidize (i.e. recycle) manganese species with lower oxidation number to manganese species with a higher oxidation number.

Preferred is a method of the present invention, wherein in step (C) the contacting is carried out for a time ranging from 1 minute to 120 minutes, preferably from 2 minutes to 80 minutes, more preferably from 3 minutes to 60 minutes, even more preferably from 5 minutes to 45 minutes, yet even more preferably from 6 minutes to 30 minutes, most preferably from 8 minutes to 15 minutes. A contacting ranging from 8 minutes to 15 minutes is most preferred for substrates comprising ABS and/or ABS-PC. A longer contacting is typically preferred if the substrate comprises a polyetherketone (PEK), preferably about 60 minutes or less.

Preferred is a method of the present invention, wherein in step (C) the contacting is carried out at a temperature ranging from 25° C. to 80° C., preferably from 30° C. to 75° C., even more preferably from 35° C. to 70° C., most preferably from 40° C. to 60° C.

As already mentioned above, in the method of the present invention commonly used fluorinated surface-active compounds are not used and can be completely prevented. Thus, preferred is a method of the present invention, wherein the pre-treatment composition and the etching composition are substantially free of, preferably do not comprise, fluorinated surface-active compounds.

More preferred is a method of the present invention, wherein the pre-treatment composition and the etching composition comprise identical fluorine-free surface-active compounds. However, they preferably differ in its concentration significantly. Most preferably, they both comprise only identical fluorine-free surface-active compounds (i.e. in terms of surface-active compounds).

Preferred is a method of the present invention comprising after step (C) the step
(D) contacting the etched substrate with an activation composition such that an activated substrate is obtained.

In this way the method of the present invention is not only a method for etching the at least one surface of the plastic substrate but is furthermore a method for activating said surface.

In many cases a rinsing between steps (C) and (D) is preferred, more preferably with water. In some cases, after step (C) a contacting with a reducing-agent containing composition is preferably carried out in order to chemically reduce residual amounts of the one or more than one manganese species on the substrate to a (more) soluble manganese species. Preferably, the rising is carried out afterwards to preferably remove any residual manganese species.

In the method of the present invention, preferably step (C) is a step separated and independent from step (D). In other words, the etching composition utilized in step (C) is not the activation composition utilized in step (D). This applies mutatis mutandis to steps (B) and (C); i.e. the etching composition utilized in step (C) is not the pre-treatment composition utilized in step (B).

Preferred is a method of the present invention, wherein in step (D) the activation composition comprises palladium, preferably dissolved palladium ions or colloidal palladium, most preferably colloidal palladium. Preferably, the colloidal palladium additionally comprises tin.

Preferred is a method of the present invention, wherein in step (D) the activation composition comprises palladium in a total concentration ranging from 5 mg/L to 200 mg/L, based on the total volume of the activation composition, preferably ranging from 10 mg/L to 150 mg/L, more preferably from 15 mg/L to 80 mg/L, even more preferably from 17 mg/L to 50 mg/L, most preferably from 20 mg/L to 40 mg/L. Preferably, this total concentration applies to both dissolved palladium ions and colloidal palladium. Above concentrations are based on the element palladium.

Preferred is a method of the present invention, wherein in step (D) the activation composition has a temperature ranging from 25° C. to 70° C., preferably from 28° C. to 60° C., more preferably from 30° C. to 55° C., even more preferably from 32° C. to 50° C., most preferably from 35° C. to 46° C.

Preferred is a method of the present invention, wherein in step (D) the contacting is carried out for a time ranging from 1 minute to 15 minutes, preferably from 2 minutes to 12 minutes, more preferably from 2.5 minutes to 9 minutes, most preferably from 3 minutes to 7 minutes.

Preferred is a method of the present invention, wherein step (D) comprises step
(D-1) contacting the activated substrate with an accelerator composition to modify the activated substrate, the accelerator composition comprising
no reducing agent but at least one complexing agent for tin ions, if in step (D) the activation composition comprises colloidal palladium, or
a reducing agent for reducing palladium ions to metallic palladium, if in step (D) the activation composition comprises palladium ions but no colloidal palladium.

Preferred is a method of the present invention, wherein in step (D-1) the accelerator composition comprises no reducing agent but at least one complexing agent for tin ions and is acidic, preferably comprising in addition sulfuric acid.

Preferred is a method of the present invention comprising after step (D) the step
(E) contacting the activated substrate with at least one metallization composition such that a metallized substrate is obtained.

In this way the method of the present invention is not only a method for etching and activating the at least one surface of the plastic substrate but is furthermore a method for metallizing said surface.

The invention will now be illustrated by reference to the following non-limiting example.

EXAMPLES

In the following examples ABS substrates were used having various shapes. However, all have in common that sharp edges, sharp bucklings and/or relief structures (e.g. having some 90° kinks/angles) were present, for example having relief-structures formed by letters. Typically, such substrates are considered as having a sophisticated surface geometry.

Example 1 CE (Comparative Example)

Pre-treatment composition: n/a
Pre-treatment parameters: n/a

Etching composition: 100 g/L potassium permanganate
(appr. 0.6 mol/L),
11 g/L sulfuric acid (appr. 0.1 mol/L), and
no surface-active compounds and no palladium ions
Etching parameters: 10 minutes,
70° C.

After etching, the etched substrates were treated with a reducing composition in order to reduce particulate manganese species into a soluble form.

Afterwards, the reduced substrates were treated with an activation composition comprising colloidal palladium (appr. 5 minutes, 45° C.) for subsequent nickel plating, followed by copper plating, and further nickel plating (including semi-bright and bright nickel plating), and finally trivalent chromium plating to obtain chromium plated substrates.

The chromium plated substrates were visually inspected. In many cases undesired pitting/skip plating was observed.

In an alternative experiment, the etching composition comprises appr. 5 g/L copper ions to stabilize the etching composition for long-term utilization.

Example 1 E (Example According to the Invention)

Example 1 CE was repeated with the difference that a pre-treatment step was implemented as follows:
Pre-treatment composition: appr. 2 to 5 g/L (appr. 0.2 to 0.5 wt.-%) of a non-ionic alcohol ethoxylate, the alcohol having 10 to 12 carbon atoms, as fluorine-free surface-active compound
besides water, no further compounds
Pre-treatment parameters: 5 to 15 seconds,
40° C.

After the pre-treatment step, no rinsing was applied between the pre-treatment step and the etching step.

Again, the chromium plated substrates were visually inspected. The pitting/skip plating disappeared. Furthermore, only a minimum amount of surface-active compounds was introduced into the etching composition. In addition, no fluorinated surface-active compounds were needed.

Example 2 CE (Comparative Example)

Pre-treatment composition: n/a
Pre-treatment parameters: n/a
Etching composition: 5 to 6 g/L in total of manganese species; comprising at least appr. 2 g/L colloidal Mn(IV) species, up to 1 g/L Mn(III) species, and up to 0.7 g/L Mn(II) species,
appr. 4 mol/L sulfuric acid,
appr. 9 mol/L phosphoric acid,
5 to 20 mmol/L silver ions, and
no surface-active compounds and no palladium and permanganate ions
Etching parameters: 15 minutes,
40° C., and
moderate air purging After etching, the etched substrates were rinsed with water in a rinsing step. No treatment with a reducing agent-comprising composition was needed to chemically reduce particulate manganese species into a soluble form. If particulate manganese species were present, they were rinsed off in the rinsing step.

Afterwards, the rinsed substrates were treated with an activation composition comprising colloidal palladium (appr. 5 minutes, 40° C.) for subsequent nickel plating and copper plating. The copper plated substrates were visually inspected. In many cases undesired skip plating was observed along the relief-structure formed by letters.

Example 2 E (Example According to the Invention)

Example 2 CE was repeated with the difference that a pre-treatment step was implemented as follows:
Pre-treatment composition: appr. 1 to 2 g/L (appr. 0.1 to 0.2 wt.-%) of a non-ionic alcohol ethoxylate, the alcohol having 10 to 12 carbon atoms, as fluorine-free surface-active compound,
appr. 250 ml phosphoric acid per 1 L pre-treatment composition,
balance water, no further compounds
Pre-treatment parameters: 5 to 15 seconds,
40° C.

After the pre-treatment step, no rinsing was applied between the pre-treatment and the etching step.

Again, the copper plated substrates were visually inspected. The skip plating disappeared. Furthermore, only a minimum amount of surface-active compounds was introduced into the etching composition. In addition, no fluorinated surface-active compounds were needed.

Example 3 CE (Comparative Example)

Pre-treatment composition: n/a
Pre-treatment parameters: n/a
Etching composition: 5 to 10 mmol/L permanganate ions,
appr. 10 mol/L phosphoric acid, and
no surface-active compounds
Etching parameters: 5 to 15 minutes,
40° C.

After etching, the etched substrates were rinsed with water and subsequently activated in an activation composition comprising colloidal palladium (appr. 5 minutes, 40° C.).

Afterwards, the activated substrates were subjected to nickel plating and copper plating (including immersion copper plating). The obtained copper plated substrates were visually inspected. In a significant number of cases undesired skip plating was observed along the relief-structured surface.

Example 3 E (Example According to the Invention)

Example 3 CE was repeated with the difference that a pre-treatment step was implemented as follows:
Pre-treatment composition: appr. 2 to 5 g/L (appr. 0.2 to 0.5 wt.-%) of a non-ionic alcohol ethoxylate, the alcohol having 10 to 12 carbon atoms, as fluorine-free surface-active compound
besides water, no further compounds
Pre-treatment parameters: 5 to 15 seconds,
40° C.

After the pre-treatment step, no rinsing was applied between the pre-treatment and the etching step.

Again, the copper plated substrates were visually inspected. The skip plating disappeared. Furthermore, only a minimum amount of surface-active compounds was introduced into the etching composition. In addition, no fluorinated surface-active compounds were needed.

In general, for all examples it was shown that as soon as a rinse step was introduced between the pre-treatment step and the etching step, it was detrimental to the very positive result and skip plating or pitting was (at least partly) observed again.

The examples above show that a significant improved plating quality was obtained if a pre-treatment step was introduced without a rinsing step prior to the etching step. This preferably generally applies to etching compositions comprising one or more than one manganese species.

The invention claimed is:

1. A method for etching at least one surface of a plastic substrate, the method comprising the steps
   (A) providing the substrate,
   (B) contacting the substrate with a pre-treatment composition such that a pre-treated substrate is obtained, the pre-treatment composition comprising
      (B-a) one or more than one fluorine-free surface-active compound,
   and
   (C) contacting the pre-treated substrate with an etching composition in an etching compartment such that an etched substrate is obtained, the etching composition comprising
      (C-a) one or more than one manganese species,
   characterized in that
      the pre-treated substrate is not rinsed after step (B) and prior to step (C), and
      the etching composition is substantially free of fluorine-containing surface-active compounds.

2. The method of claim 1, wherein in (B-a) the one or more than one fluorine-free surface-active compound comprises a non-ionic surfactant.

3. The method of claim 1, wherein in the pre-treatment composition (B-a) has a total concentration ranging from 0.01 wt.-% to 40 wt.-%, based on the total weight of the pre-treatment composition.

4. The method of claim 1, wherein in the pre-treatment composition water and (B-a) together form 98 wt.-% or more of the total weight of the pre-treatment composition.

5. The method of claim 1, wherein the etching composition is acidic.

6. The method of claim 1, wherein in the etching composition (C-a) has a total concentration ranging from 0.001 mol/L to 1.8 mol/L, based on the total volume of the etching composition and based on the element manganese.

7. The method of claim 1, wherein in the etching composition the one or more than one manganese species comprises permanganate ions, manganese species comprising the element manganese in an oxidation number of +IV, or both permanganate ions and manganese species comprising the element manganese in an oxidation number of +IV.

8. The method of claim 1, wherein the etching composition further comprises
   (C-c) one or more than one species of transition metal ions different from manganese.

9. The method of claim 1, wherein the one or more than one fluorine-free surface-active compound in the pre-treatment composition is at least partly dragged out from the pre-treatment composition and dragged in into the etching composition.

10. The method of claim 1, wherein any total amount of fluorine-free surface-active compounds in the etching composition originates from the pre-treatment composition.

11. The method of claim 1, wherein the etching composition is substantially free of, preferably does not comprise, trivalent chromium ions and hexavalent chromium compounds, preferably is substantially free of, preferably does not comprise, any ions and compounds comprising chromium.

12. The method of claim 1, wherein in step (C) the contacting is carried out for a time ranging from 1 minute to 120 minutes.

13. The method of claim 1, wherein in step (C) the contacting is carried out at a temperature ranging from 25° C. to 80° C.

14. The method of claim 1, wherein the pre-treatment composition and the etching composition are substantially free of fluorinated surface-active compounds.

15. The method of claim 1, wherein the pre-treatment composition and the etching composition comprise identical fluorine-free surface-active compounds.

* * * * *